Sept. 24, 1957 F. SCHOLZ 2,807,726
CASSETTE HOLDER FOR X-RAY MACHINE
Filed Feb. 17, 1953 2 Sheets-Sheet 1
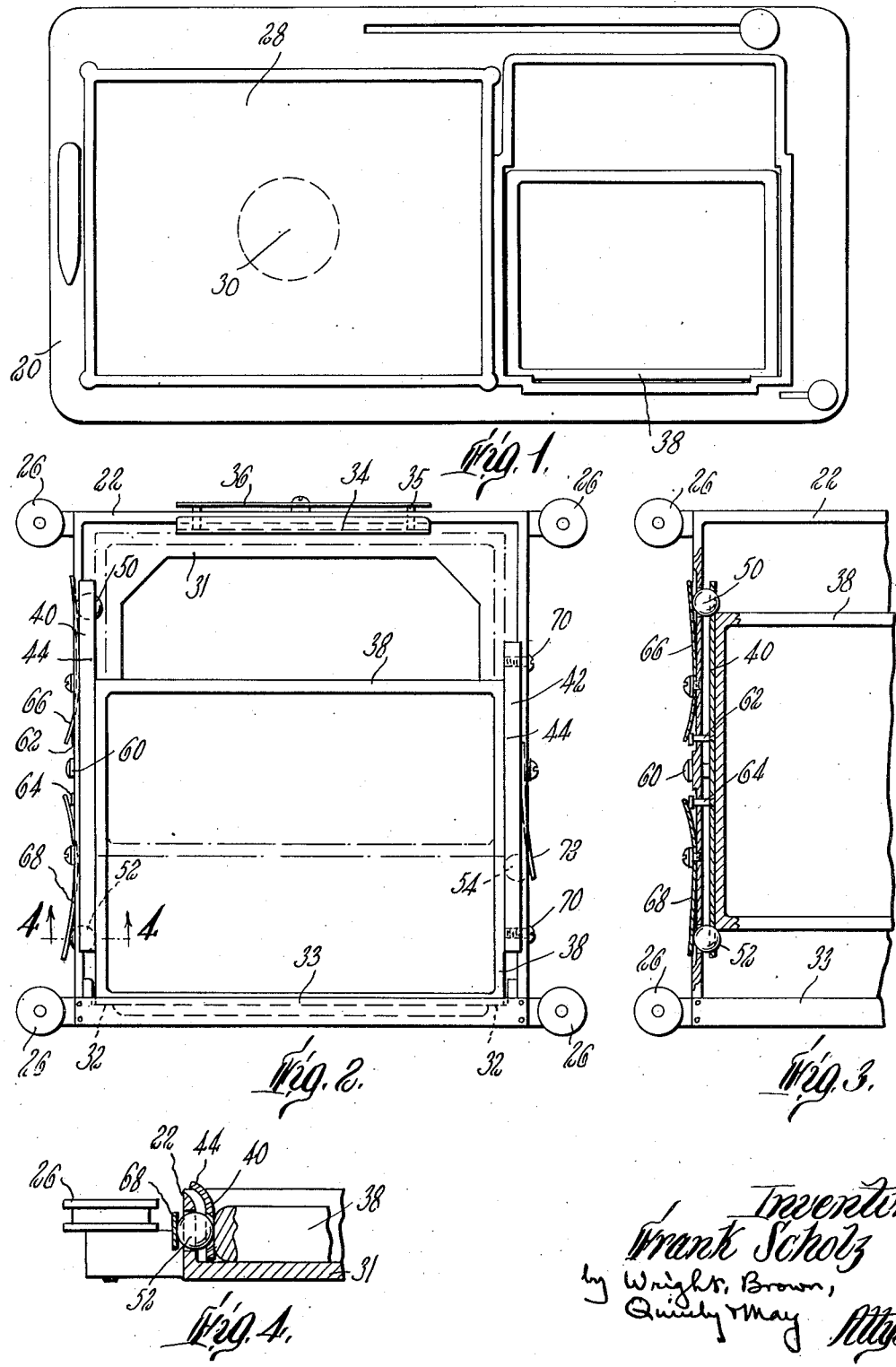
Inventor
Frank Scholz
by Wright, Brown,
Quinby & May
Attys.

Sept. 24, 1957 F. SCHOLZ 2,807,726
CASSETTE HOLDER FOR X-RAY MACHINE
Filed Feb. 17, 1953 2 Sheets-Sheet 2
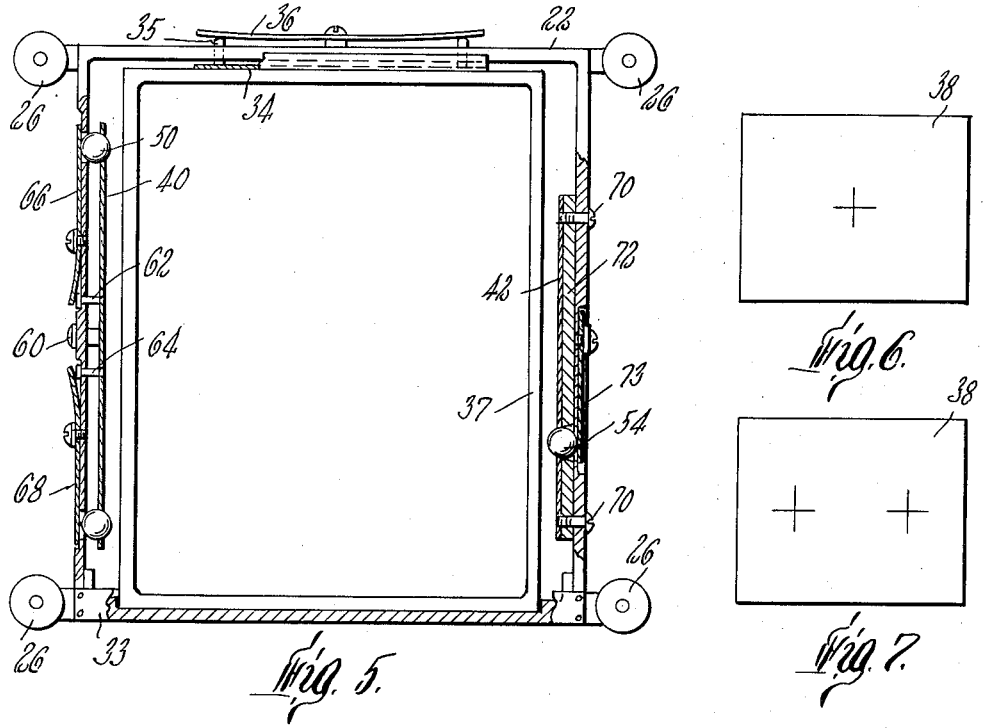
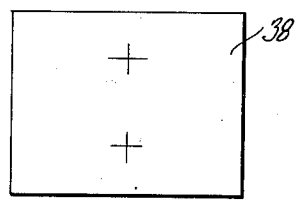
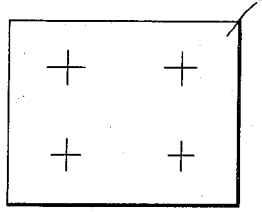
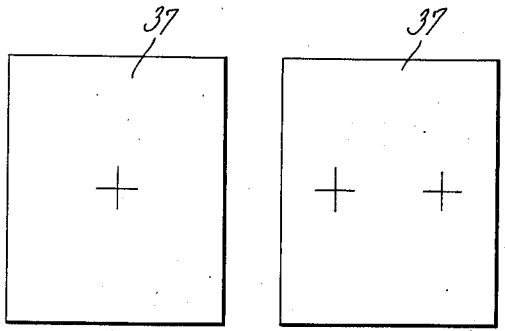
Inventor
Frank Scholz
by Wright, Brown,
Quinby & May Attys.

United States Patent Office 2,807,726
Patented Sept. 24, 1957

2,807,726

CASSETTE HOLDER FOR X-RAY MACHINE

Frank Scholz, Wayland, Mass.

Application February 17, 1953, Serial No. 337,270

3 Claims. (Cl. 250—66)

This invention relates to an improved cassette holder for use in an X-ray machine. In using such a machine for taking X-ray photographs, a cassette containing a sheet of sensitized film is placed in a cassette holder or carriage having at or near its corners wheels that run on tracks in a rectangular frame. The cassette holder or carriage can thus be shifted edgewise from a loading station where it receives a cassette to an exposing station where the cassette is exposed to a beam of X-rays emanating from an X-ray tube and directed toward a window in the frame at the exposing station, the object to be examined being placed between the source of rays and the window. For some objects the entire film is exposed, but when small objects are to be examined it is desirable for reasons of economy and clarity of definition to expose only a portion of the film, that is, one half or one quarter of the film. In the X-ray machine, the ray projector is mounted so that the center of the beam is trained on the center of the window in the frame. Hence when the cassette in the carriage is shifted from the loading station to the exposing station, the carriage must be stopped when the center of the portion of the film which is to be exposed is substantially in line with the center of the X-ray beam. To facilitate the task of properly locating the cassette in positions for successive exposures of halves or quarters of the film therein for the operator who has to operate the machine in nearly complete darkness, mechanism has been devised for automatically stopping the cassette holder in correct positions for exposure of succesive portions of the film when the holder is shifted back and forth between the loading station and the exposing station. Such mechanism is described and illustrated in United States Patent No. 2,560,782, granted July 17, 1951. By the use of devices shown in the patent for stopping the cassette holder at any one of three points as it travels horizontally from the loading station, and by constructing the holder so that the cassette can be inserted and held in either of two vertically spaced positions, six conditions of exposure can be had, as follows: first, exposure of the entire film with its long axis vertical; second, exposure of the right and left halves of the film with its major axis vertical; third, exposure of the whole film with its axis horizontal; fourth, exposure of the right and left halves of the film, the major axis being horizontal; fifth, exposure of the upper and lower halves of the film with its axis horizontal; and sixth, exposure of the quarters of the film, the axis being horizontal. In order to make exposures under the fifth and sixth conditions when employing the patented apparatus, it is necesary to remove the cassette from the holder after the upper half of the film has been exposed and to reinsert the cassette after inverting it so that the other half of the film will be uppermost and thus in at the proper level for exposure.

An object of the present invention is to improve the patented apparatus so that the upper and lower portions of a film can be properly located for exposure without removal of the cassette from the holder. According to the invention, this is done by taking advantage of the fact that the accepted standard sizes of cut film which are commercially available and are employed in X-ray machines happen to be such that the length of each size is equal or nearly equal to the width of the next larger size. The standard sizes referred to are: 5" x 7", 6½" x 8½", 8" x 10", 10" x 12", 11" x 14" and 14" x 17". My improved cassette holder is designed to receive and to position for exposure two sizes of cassettes instead of one size only as heretofore. The larger size is received in one position only, that is, with its major axis vertical. The smaller size is received with its major axis horizontal but can be held in any one of three locations differing in elevation. As hereinafter explained, the larger cassette can be used for exposures where the desired field is large with the major axis vertical and with either full or half width. The smaller cassette is used for smaller fields including relatively narrow areas with horizontal major axes, and areas which are quarters of the film, the latter being desirable when a compression cone is used in making the exposures. In making multiple exposures using different areas of a cut film, in no case is it necesary to remove the cassette from the holder before the entire area of the film has been exposed piecemeal. Since a great detail of diagnostic work has to do with small areas exposed through a compression cone, the present invention is of great benefit to X-ray machine operators since after a part of a film has been exposed and the cassette holder has been returned to the inactive position and then advanced toward an exposing station, the mechanism automatically stops the holder at the right place for the next exposure and the only manipulation of the cassette required is to shift it upward in the holder at the loading station without removing it from the holder until all the exposures on that film have been made.

For a more complete understanding of the invention, reference may be had to the following description thereof and to the drawing, of which—

Figure 1 is a front elevation of a frame in which a cassette holder travels;

Figure 2 is a front elevation of the cassette holder itself, embodying the invention, with a cassette therein;

Figure 3 is a fragmentary front elevation similar to Figure 2, but with the cassette in a different position;

Figure 4 is a section on the line 4—4 of Figure 3;

Figure 5 is a front elevation of the cassette holder with a cassette of larger size mounted therein;

Figures 6 to 9 are diagrammatic outlines of the smaller cassette, showing various arrangements of exposures; and Figures 10 and 11 are diagrammatic outlines of the larger cassette showing arrangements of exposures.

The frame 20 illustrated in Figure 1 is in general similar to that illustrated and described in detail in Patent No. 2,560,782, hereinbefore referred to, and includes mechanism by which a cassette holder 22 with a cassette mounted therein runs on wheels 26 from an inactive or loading position (at the right as shown in Figure 1) to one or another of three active positions behind a screen 28, in which positions some part of the film carried by the cassette is in line with the beam of X-rays projected from the cathode of the X-ray tube (not shown). The center of the beam is trained on the center 30 of the screen and the diameter of the beam is regulated by the usual shutters (not shown). After each exposure the cassette and its holder are returned to the inactive position. Mechanism by which the cassette holder is made to stop automatically at the desired stations in proper succession in accordance with the areas of the film which are to be exposed is shown and described in said Patent No. 2,560,782. Thus the cassette holder is made to stop at the mid station when the whole area of the film is to be covered in one exposure or the upper or lower half of the film is to be exposed. When the halves on either side of the vertical median of the film are to be successively exposed or when quarters of the film are to be separately exposed, the mechanism automatically stops the cassette holder alternately at the first and third stations.

The cassette holder 22 is an open rectangular frame adapted to receive one size of cassette with a horizontal major axis and also to receive the next larger sized cassette with a vertical major axis. For example, the holder can be made for use with cassettes having 6½" x 8½" and 8" x 10" films respectively. Such cassettes would ordinarily have overall dimensions of 7½" x 9½" and 9" x 11" respectively. The width of the opening in the cassette holder would then be 9½" plus an extra half inch or so to accommodate resilient means, hereinafter described, by which a cassette is held releasably in the opening of the holder. The holder can thus receive the smaller cassette with its major axis horizontal. The height of the opening would be a little over 11" to accommodate the major axis of the larger cassette. The holder frame has a narrow inward flange 31 to provide a shoulder against which a cassette is pushed when being inserted in the holder. Since in the example taken the length of the smaller cassette is half an inch greater than the width of the larger cassette, the width of the opening in the holder is greater than that of the larger cassette. Hence, to center the larger cassette in the holder, reentrant blocks 32 are provided in the lower corners of the holder, the distance between these blocks being equal to the width of the larger cassette. To facilitate the correct insertion of a cassette in the holder by the sense of touch, a narrow plate 33 is secured across the front of the bottom member of the holder. When a cassette is introduced into the holder its lower edge is inserted into the channel between the plate 33 and the flange 31. The cassette is then pushed in until the side elements of the flange 31 are engaged by the cassette, if of the smaller size, or the upper element of the flange 31 is engaged by the cassette if of the larger size.

To hold the cassette in place in the holder, the latter is provided with presser devices at its top and sides. At the top, a gib 34 is secured to pins 35 which extend slidably through the top element of the holder frame and are headed at their outer ends to limit their inward movement. The pins are pressed inward by spring means. As shown, a leaf spring 36 is secured at its mid point on the outside of the holder frame in such a way that the end portions of the spring press against the heads of the pins 35. When a cassette 37 of the larger size is inserted into the holder as in Figure 5, its lower edge is thrust into the groove behind the plate 33 and between the blocks 32. The upper end of the cassette is swung in against the flange 31. The gib is pushed up against the pressure of the spring 36 which then presses the gib against the top edge of the cassette 37 sufficiently to hold the cassette in place in the holder.

Gibs 40 and 42 are also provided at the sides of the holder to be engaged by the ends of a cassette 38 of the smaller size. All three of the gibs preferably have an outturned lip 44 to guide the cassette into place and to cam the gib outward when the cassette is pushed against it. The perimeter of the cassette is preferably rounded, as indicated in Figure 4, so as to slide more freely on the lip 44.

An important feature of the invention is the provision of means whereby a cassette of the smaller size can be held in any one of three different positions in the holder and can be readily moved into any of these positions by the sense of touch. The three positions are at three different levels in the holder so that the center of the X-ray beam will impinge on the film in the cassette at its longitudinal median, as in Figures 6 and 7, or above or below the median as in Figures 8 and 9. In the former case, the cassette should be located so that half the area of the film is above the level of the point 30 which is where the center of the beam meets the screen. In the latter cases, the cassette should be located so that one quarter or three quarters of the area of the film is above the level of the point 30.

For defining such positions for the cassette and for holding the cassette in place, three yielding bosses are provided to project inward from the sides of the holder frame. As shown, two such bosses 50 and 52 project inward from the left hand side of the frame, the third boss 54 projecting in from the right hand side of the frame. The bosses 50 and 52 are vertically spaced apart so that two corners of the cassette fit snugly between them, the third boss 54 pressing against the opposite end of a cassette thus located. This determines the mid position of the cassette. The low position of the cassette is determined by the blocks 32 on which the lower edge of the cassette engages when it is in such position. The cassette is in its upper position when one of its lower corners rests on the boss 54, the latter being suitably located for that purpose. When a cassette 38 of the smaller size is inserted into the holder, it is at first in its low position with its lower edge resting on the block 32, its end edges being pressed by the bosses 52 and 54 to hold the cassette frictionally in place. The cassette can then be manually pushed upward to its mid or high position in the holder opening. Its mid position is reached when the left hand edge fits between the bosses 50 and 52, the cassette being then held in place by pressure of the boss 54 against its opposite edge. The high position is reached when the lower right hand corner of the cassette passes and rests on the boss 54, the cassette then being held by pressure of the boss 50 on its left hand edge.

The bosses 50, 52 and 54 may be variously constructed. As shown on the drawing, they each consist of an end zone of a spherical ball bearing. The balls 50 and 52 are inserted through holes in the frame of the holder 22 which are slightly larger than a great circle of the balls. These balls also seat in holes in the gib 40 which are smaller than a great circle of the balls but which permit the balls to project a limited distance into the opening of the holder, these projecting portions being the yielding bosses which are engaged by the cassette when the latter is inserted into the holder. The rounded edges of the cassette 38, indicated in Figure 4, slide easily on the round surfaces of the balls 50, 52 and 54 so that the cassette moves into place without sticking. The gib 40 is attached to the holder by a rivet 60 at or near its mid point, about which point it can rock longitudinally. Such rocking movement is resiliently opposed by the balls 50 and 52 and also by two pins 62 and 64 which extend slidably through holes in the holder frame 22 near the rivet 60. The inner ends of the pins 62 are secured to the gib 40. The outer ends are headed to limit the inward movement of the pins as indicated in Figure 3. Suitable springs are provided to press the balls and pins inward. As shown, a leaf spring 66 is secured at a point spaced from its ends to the outer surface of the holder frame 22, the spring 66 being arranged so that one end portion presses on the ball 50 and the other end portion presses on the head of the pins 62. In like manner a leaf spring 68 is mounted on the holder frame to press the ball 52 and the head of the pin 64.

In the example illustrated, the gib 40 yields sufficiently for the admission of the cassette. Hence the gib 42 can be secured to the holder frame rigidly by a couple of screws 70 or otherwise, a spacing strip 72 being inserted between the gib and the frame so that the gib 42 is spaced from the frame as much as the gib 40 is, thus centering the cassette with reference to the sides of the frame. A leaf spring 73 is fastened to the holder frame with a free end portion pressing the ball 54 inward.

I claim:

1. A cassette holder with a rectangular opening in which to receive a film-loaded cassette with its major axis horizontal, and means in said holder for holding said cassette releasably in any one of three positions of elevation within the holder, said means comprising two bosses resiliently projecting inward from one side of the holder and a third boss resiliently projecting inward from the other side of the holder, said two bosses being spaced from each other by a distance approximately equal to the vertical dimension of said cassette and equally spaced respectively from the top and bottom of said holder, said third boss being spaced from the bottom of the holder about one quarter of the distance from the bottom to the top of the holder.

2. A cassette holder with a rectangular opening in which to receive and hold a film-loaded cassette with its major axis horizontal, and means in said holder for holding said cassette releasably in any one of three positions of elevation, within the holder, to wit, lower, mid and upper positions, in which positions one quarter, one half and three quarters respectively of the film area is above a predetermined level, said holding means comprising two vertically spaced bosses projecting yieldingly from one side of said opening to engage at different levels an edge of a cassette in said opening and a third boss projecting yieldingly from the opposite side of said opening at a level between the levels of the first two bosses to engage the opposite edge of said cassette.

3. A cassette holder as described in claim 2, said holder having a gib within said opening carrying said two bosses and extending along a side of said opening, spring means pressing said gib and bosses inward toward the center of the opening, a second gib within said opening carrying said third boss and extending along the opposite side of the opening, and spring means pressing said third boss toward the center of the opening.

References Cited in the file of this patent

UNITED STATES PATENTS

| 1,857,381 | Huebner | May 10, 1932 |
| 2,552,858 | Mueller | May 15, 1951 |
| 2,560,782 | Scholz | July 17, 1951 |

FOREIGN PATENTS

| 75,860 | Germany | Mar. 26, 1919 |
| 657,249 | Germany | Feb. 26, 1938 |